United States Patent [19]
Tsubota

[11] Patent Number: 5,555,559
[45] Date of Patent: Sep. 10, 1996

[54] MICROPROCESSOR CAPABLE OF ENSURING FLEXIBLE RECOVERY TIME FOR I/O DEVICE BY INSERTING IDLE STATES

[75] Inventor: Masashi Tsubota, Tokyo, Japan

[73] Assignee: NEC Corporation, Tokyo, Japan

[21] Appl. No.: 222,320

[22] Filed: Apr. 4, 1994

Related U.S. Application Data

[63] Continuation of Ser. No. 717,841, Jun. 21, 1991, abandoned.

[30] Foreign Application Priority Data

Jun. 21, 1990 [JP] Japan ................... 2-164900

[51] Int. Cl.[6] .......................................... G06F 13/14
[52] U.S. Cl. ................ 395/879; 395/878; 395/500; 395/550; 364/DIG. 1; 364/271.5; 364/271.8
[58] Field of Search ................... 395/275, 500, 395/550, 878, 879, 800; 364/DIG. 1, DIG. 2

[56] References Cited

U.S. PATENT DOCUMENTS

| | | | |
|---|---|---|---|
| 4,507,732 | 3/1985 | Catiller et al. | 395/879 |
| 4,631,702 | 12/1986 | Korba | 395/550 |
| 4,772,888 | 9/1988 | Kimura | 340/825.5 |
| 5,021,985 | 6/1991 | Hu et al. | 364/748 |
| 5,065,313 | 11/1991 | Lunsford | 345/879 |
| 5,125,088 | 6/1992 | Culley | 345/500 |
| 5,155,812 | 10/1992 | Ehlig et al. | 395/879 |
| 5,163,135 | 11/1992 | Nakamura | 395/287 |
| 5,220,659 | 6/1993 | Larson et al. | 395/500 |

FOREIGN PATENT DOCUMENTS

| | | |
|---|---|---|
| 212636 | 4/1987 | European Pat. Off. . |
| 309989 | 5/1989 | European Pat. Off. . |

OTHER PUBLICATIONS

Kuwata, Patent Abstracts of Japan, vol. 14, No. 286, p. 99, JP 2-85951 (20 Jun. 1990).

*Primary Examiner*—Lance Leonard Barry
*Attorney, Agent, or Firm*—Whitham, Curtis, Whitham & McGinn

[57] ABSTRACT

A microprocessor which has bus cycles of a memory access operation, an I/O access operation, and an idle state, includes a register for storing the number of the idle states to be inserted when first and second I/O accesses are consecutively executed, and a counter circuit for counting a clock when the first I/O access has been executed. A resetting circuit receives a signal indicating that the last access is the I/O access and resets the counter circuit when the first I/O access has been executed, and a comparator compares an output of the register with an output of the counter circuit for generating a recovery end signal when coincidence is detected. A timing generator generates state signals to the effect that the second I/O access is not executed until the recovery end signal is generated. With the inventive configuration, in the case of consecutive I/O accesses, after completion of a first I/O access, the idle state, in which no bus access is executed, is repeatedly inserted, with the number of idle states being inserted being counted by the counting circuit. The number of repeated idle states counted by the counting circuit is compared with the value stored in the memory and, when coincidence is detected, the recovery end signal is outputted so that a next I/O access is started.

2 Claims, 5 Drawing Sheets

MICROPROCESSOR CAPABLE OF ENSURING FLEXIBLE RECOVERY TIME FOR I/O DEVICE BY INSERTING IDLE STATES

This is a continuation of application Ser. No. 07/717,841 filed Jun. 21, 1991 abandoned.

BACKGROUND OF THE INVENTION

1. Field of the Invention

The present invention relates to a microprocessor, and more specifically a microprocessor capable of ensuring a recovery time of an I/O (input/output) device in bus cycles for consecutive I/O accesses.

2. Description of Related Art

Conventional microprocessors have operated at a relative low operation frequency, and required a relatively large number of clocks, typified by three or four clocks, for each one bus cycle, so that a final clock in each bus cycle can be used for recovery. Therefore, a recovery time for a peripheral I/O control LSI is ensured and fulfilled. Accordingly, when an external bus cycle is triggered, a bus cycle similar to a memory access has been performed in an I/O access.

A typical conventional timing generator has been composed of a combinational circuit having outputs for generating a state T1 signal, a state T2 signal, a state T3 signal, a state T4 signal and an idle state Ti signal, respectively, in such a manner that only one of the five state signals is active. Five latches are provided for latching the state T1 signal, the state T2 signal, the state T3 signal, the state T4 signal and the idle state Ti signal, respectively, in synchronism with a clock. These five state signals latched in the five latches am supplied as control signals, and also fed back to the combinational circuit itself for generation of a next active state signal. The combinational circuit also receives a reset signal RESET, an access request signal ACCRQ, and a ready signal READY. For example, the combinational circuit is formed of a programmable logic array (PLA), which realizes the following state transition table 1:

TABLE 1

| NOW | NEXT | RESET | ACCRQ | READY |
|-----|------|-------|-------|-------|
| —   | Ti   | 1     | —     | —     |
| Ti  | T1   | 0     | 1     | —     |
| Ti  | Ti   | 0     | 0     | —     |
| T1  | T2   | 0     | —     | —     |
| T2  | T3   | 0     | —     | —     |
| T3  | T3   | 0     | —     | 1     |
| T3  | T4   | 0     | —     | 0     |
| T4  | T1   | 0     | 1     | —     |
| T4  | Ti   | 0     | 0     | —     |

In the above table 1, the column "NOW" indicates an active state signal currently outputted from the combination circuit, and the column "NEXT" indicates an active state signal which will be outputted from the combination circuit after a clock signal is applied.

In this example, a basic bus cycle is completed with four clocks of the state T1, the state T2, the state T3 and the state T4. As seen from the above table, if the reset signal RESET is applied, the condition enters into the idle state Ti, and the idle state Ti is repeated until the access request signal ACCRQ is applied. If the access request or the I/O access request is generated, the condition enters into the state T1. The T1 state will without exception change to the state T2, which will also without exception change to the state T3. If there exists a wait request due to the ready signal READY, the state T3 is repeated. Finally, the condition changes to the state T4 which is a last condition of the bus cycle.

For example, in consecutive I/O accesses of an I/O read bus cycle and a succeeding I/O write bus cycle on the basis of the above mentioned basic states, a recovery time corresponding to about one clock is ensured after completion of the I/O read data access until a start of acknowledgement of a next I/O write address access. If the frequency of the clock signal is 5 MHz, a period of one clock is 200 nanoseconds. Therefore, it is possible to connect an external I/O device having a recovery time not greater than 200 nanoseconds. On the other hand, since the recovery time is ensured for each bus cycle regardless of whether the access is the I/O access or the memory access, the efficiency has been low, particularly in the memory access.

Here, assuming that the same I/O device is consecutively accessed, the "recovery time" means a command recovery time after completion of execution of a first command of the I/O device until start of acknowledgement of a second command of the same I/O device. It is necessary to couple each I/O device in such a manner that the command recovery time is fulfilled or ensured.

Recent improvement of performance of the microprocessors have accompanied with the inclination of increase of the clock frequency and simplification of the bus cycle with the result that each one bus cycle is composed of only one clock or two clocks. Here, assuming that the clock frequency is 10 MHz which is sufficiently higher than 5 MHz of the conventional microprocessor, the period of one clock becomes 100 nanoseconds. This will make it impossible to ensure the recovery time when the conventional I/O device is coupled.

In addition, when the bus cycle is simplified, for example, when each one bus cycle is composed of two clocks, it becomes impossible to have the recovery time between consecutive I/O accesses. This ultimately gives an adverse effect to the memory access.

SUMMARY OF THE INVENTION

Accordingly, it is an object of the present invention to provide a microprocessor which has overcome the above mentioned defect of the conventional one.

Another object of the present invention is to provide a microprocessor which can be coupled to an existing I/O device without modification of the existing I/O device even if the clock frequency of the microprocessor is increased, and which gives no adverse effect to a memory access even in the case of consecutive I/O accesses.

The above and other objects of the present invention are achieved in accordance with the present invention by a microprocessor which has bus cycles of a memory access operation, an input/output access operation, and an idle state, the microprocessor comprising:

detecting means for detecting that the input/output access operation is consecutively executed;

memory means for storing the number of the idle states to be inserted;

counting means for counting a clock;

means for comparing an output of the memory means with an output of the counting means, and for generating a recovery end signal when the output of the memory means becomes coincident with the output of the counting means; and control means for resetting the counting means when the input/output access operation is executed, and for controlling to the effect that a next input/output access operation is not executed until the recovery end signal is generated, when it is detected that the input/output access operation is consecutively executed.

In a preferred embodiment, the detecting means includes a timing generator, which includes:

a combinational circuit receiving a first state signal and a second state signal for an access operation, an idle state signal, the recovery end signal, a last access signal, a memory input/output signal, an access request signal, a ready signal and a reset signal, the combination circuit generating the first state signal, the second state signal, and the idle state signal;

first, second and third latches for latching the first state signal, the second state signal, and the idle state signal, respectively, in response to the clock signal, the first, second and third latches being cleared by the reset signal; and an inverter connected to an output of the first latch so as to output a bus cycle start signal which is formed of an inverted signal of the output of the first latch.

In addition, the memory means includes a recovery register circuit receiving a recovery register read signal, a recovery register write signal, and a recovery data of n bits, and having a n-bit register for storing the number of the idle states defining the recovery time.

With the above mentioned arrangement, in the case of consecutive I/O accesses, after completion of a tint I/O access, the idle state in which no bus access is executed is repeatedly inserted, and on the other hand, the number of the idle states being repeated is counted by the counting means. The number of the repeated idle states counted by the counting means is compared with the value of the memory means, and when coincidence is detected, the recovery end signal is outputted so that a next I/O access is started.

Therefore, since it is possible to set the length of the recovery time so as to match with an I/O device, an existing I/O device can be used without modification. In addition, since a recovery processing is added only in the case of consecutive 1/0 accesses, no adverse effect is given to the case of the memory access.

The above and other objects, features and advantages of the present invention will be apparent from the following description of preferred embodiments of the invention with reference to the accompanying drawings.

DESCRIPTION OF THE PREFERRED EMBODIMENTS

Figure 1:
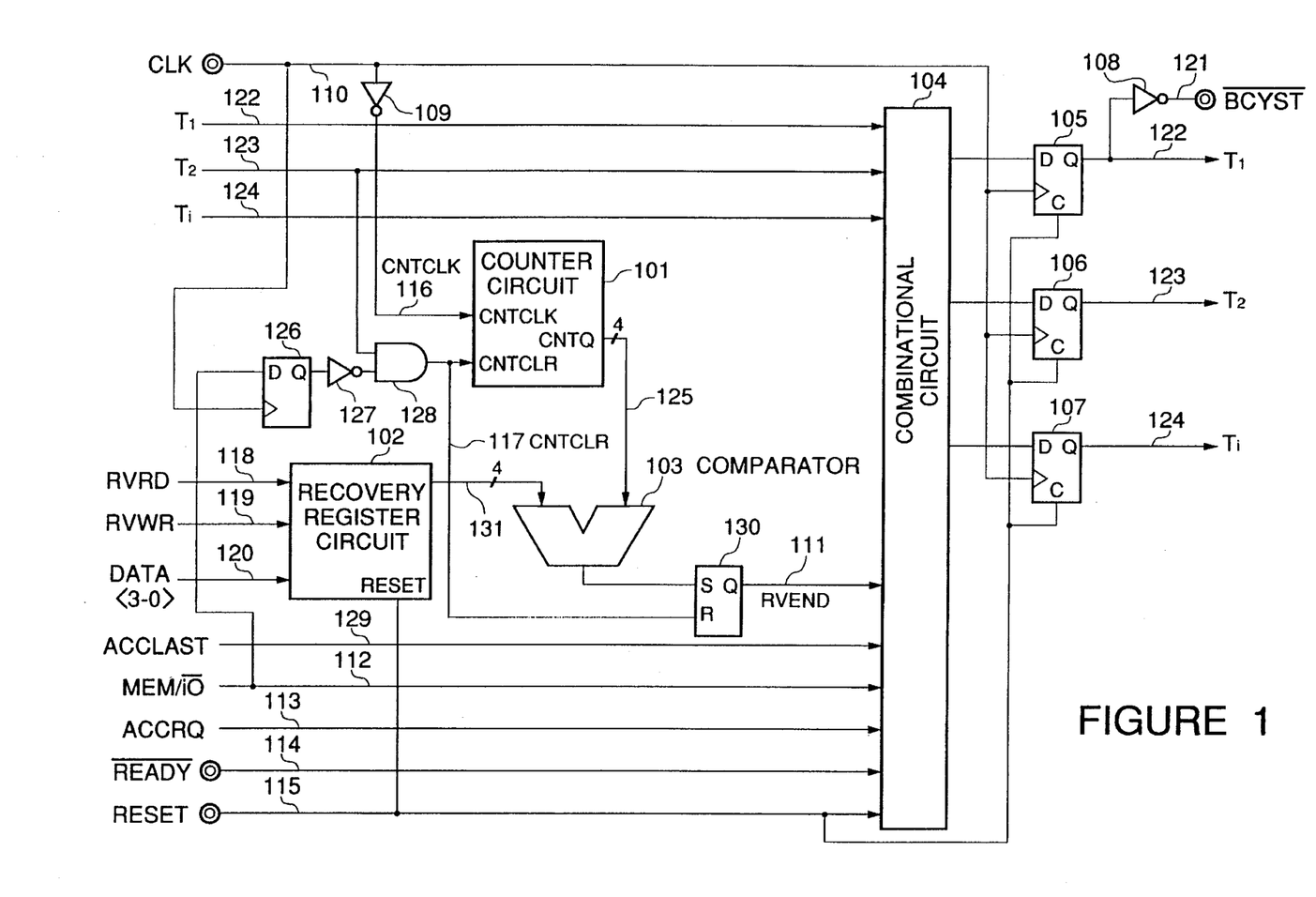
FIG. 1 is a block diagram of an essential part of one embodiment of the microprocessor in accordance with the present invention.

Referring to FIG. 1, there is shown a block diagram of an essential part of one embodiment of the microprocessor in accordance with the present invention. The shown circuit is a state signal generation circuit of the microprocessor in accordance with the present invention. Other portions of the microprocessor in accordance with the present invention are the same as corresponding ones of conventional microprocessors, and therefore, those portions will not be shown in the drawings and explanation thereof will be omitted.

The shown state signal generation circuit includes a four-bit counter circuit 101 having a count input CNTCLK connected to an output of an inverter gate 109. This inverter gate 109 receives a clock signal CLK 110 and supplies an inverted signal of the clock signal CLK, as a counter clock 116, to the counter circuit 101. The shown state signal generation also includes a D-type flipflop 126 having a data input D connected to receive a memory I/O signal MEM/$\overline{IO}$ 112 and a clock input connected to receive the clock 110. A Q output of the flipflop 126 is inverted by an inverter gate 127, which in turn has an output connected to one input of a 2-input AND gate 128. The other input of the AND gate 128 is connected to receive a T2 state signal 123, and an output of the AND gate 128 generates a counter clear signal CNTCLR 117 to a clear input CNTCLR of the counter circuit 101.

A recovery register read signal RVRD 118, a recovery register write signal RVWR 119 and a recovery time data signal DATA<3-1> 120 are supplied to a four-bit recovery register circuit 102, which stores, in the inside of the microprocessor, the number of Ti or idle states corresponding to a recovery time. An output of the recovery register circuit 102, which is data of four bits 131 indicating the number of the Ti or idle states corresponding to the recovery time, is supplied to one input of a comparator 103. The other input of the comparator 103 is connected to an output CNTQ 125 of the counter circuit 101, which is also data of four bits. When coincidence is detected, the comparator 103 generates a high level signal at its output, which is connected to a set input S of a R-S flipflop 130. A reset input of this flipflop 130 is connected to the output of the AND gate 128, and the flipflop 130 generates at its Q output a recovery end signal RVEND 111.

The shown circuit also includes a combinational circuit 104 receiving a T1 state signal 122, the T2 state signal 123, a Ti state signal 124, the recovery end signal RVEND 111, a last access signal ACCLAST 129, the memory I/O signal MEM/$\overline{IO}$ 112, an access request signal ACCRQ 113, a ready signal $\overline{READY}$ 114, and a reset signal RESET 115. In addition, the combinational circuit 104 generates the T1 state signal 122, the T2 state signal 123 and the Ti state signal 124, which are latched in three D-type flipflops 105, 106 and 107 in synchronism with the clock CLK 110. These flipflops 105, 106 and 107 are cleared by the reset signal RESET 115. A Q output of the flipflop 105 is connected to an inverter gate 108, which generates an inverted signal of the Q output signal 105 as a bus cycle start signal $\overline{BCYST}$ 121.

Here, the combinational circuit 104, the D-type flipflops 105, 106 and 107, and the inverter gate 108 constitutes a timing generator.

Figure 2:
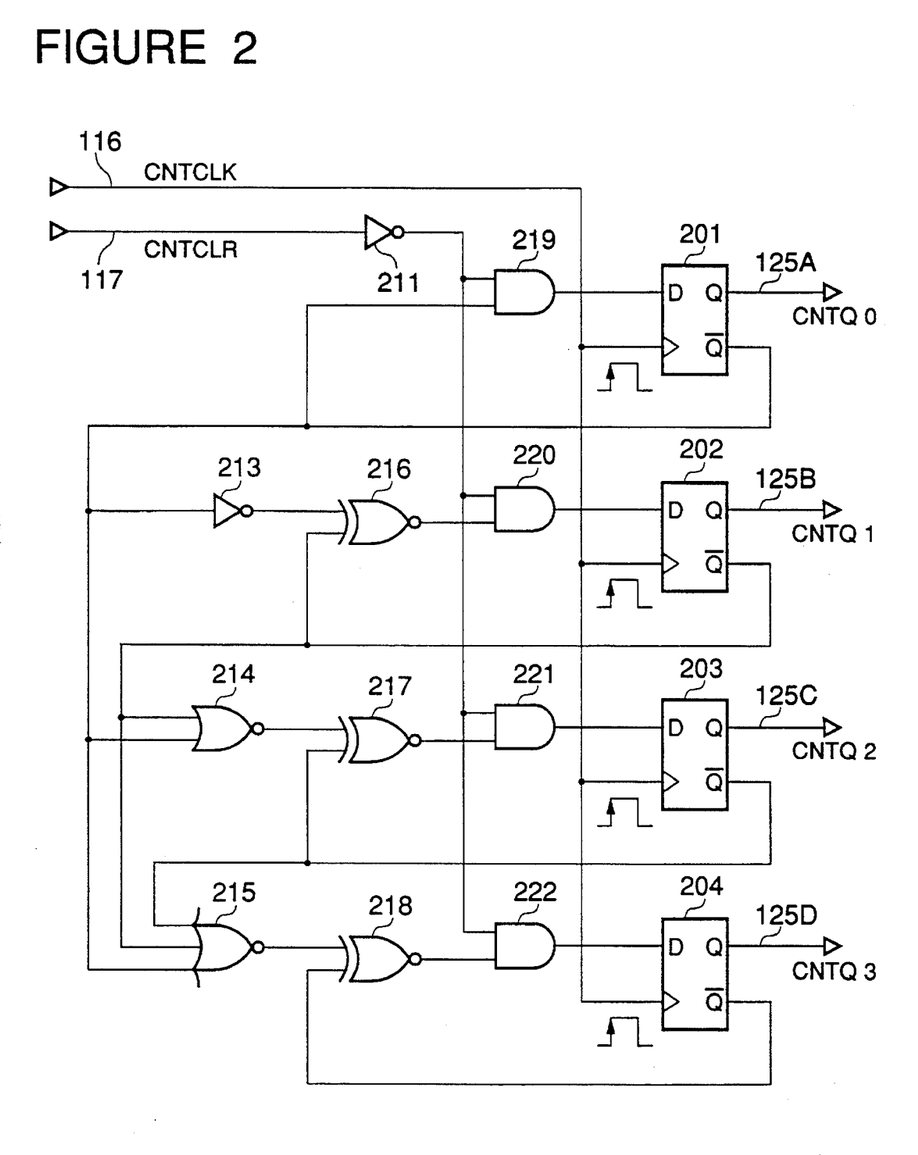
FIG. 2 is a logic circuit diagram of the counter circuit shown in FIG. 1.

Referring to FIG. 2, the counter circuit 101 includes four D-type flipflops 201, 202, 203 and 204, each of which latches a signal applied to its data input D, in synchronism with a rising edge of the counter clock signal CNTCLK 116. The D-type flipflops 201, 202, 203 and 204 output their latched signal from their Q output as a counter output signal CNTQ0 125A, a counter output signal CNTQ1 125B, a counter output signal CNTQ2 125B, and a counter output signal $\overline{\text{CNTQ3}}$ 125B, respectively. In addition, in order to count up $\overline{Q}$ outputs of the flipflops 201 to 204 by staring up with the counter clear signal CNTCLR 117, the counter circuit 101 also includes inverter gates 211 and 213, NOR gates 214 and 215, exclusive-NOR gates 216, 217 and 218, and AND gates 219, 220, 221 and 222, connected as shown.

Specifically, the counter clear signal CNTCLR 117 is supplied to the inverter gate 211, which has an output connected to one input of each of the AND gates 219, 220, 221 and 222, and outputs of the AND gates 219, 220, 221 and 222 are connected to dam inputs D of the flipflops 201, 202, 203 and 204, respectively.

The $\overline{Q}$ output of the flipflop 201 is connected to the other input of the AND gate 219, and also connected through the inverter 213 to one input of the exclusive-OR circuit 216. The other input of the exclusive-OR circuit 216 is connected to the $\overline{Q}$ output of the flipflop 202, and an output of the exclusive-OR circuit 216 is connected to the other input of the AND gate 220.

The $\overline{Q}$ outputs of the flipflops 201 and 202 are connected to the NOR gate 214, which has an output connected to one input of the exclusive-OR circuit 217. The other input of the exclusive-OR circuit 217 is connected to the $\overline{Q}$ output of the flipflop 203, and an output of the exclusive-OR circuit 217 is connected to the other input of the AND gate 221.

The $\overline{Q}$ outputs of the flipflops 201, 202 and 203 are connected to the NOR gate 215, which has an output connected to one input of the exclusive-OR circuit 218. The other input of the exclusive-OR circuit 218 is connected to the $\overline{Q}$ output of the flipflop 204, and an output of the exclusive-OR circuit 218 is connected to the other input of the AND gate 222.

In the shown counter circuit, the counter output 125A constitutes the least significant bit CNTQ0, and the counter output 125D constitutes the most significant bit CNTQ3. The shown counter circuit is counted up in synchronism with the counter clock signal CNTCLK 116. When the counter clear signal CNTCLR 117 is rendered active, if the counter clock signal CNTCLK 116 is raised up, the counter circuit 101 is cleared so that the counter outputs 125A to 125D are brought to "0000".

Figure 3:
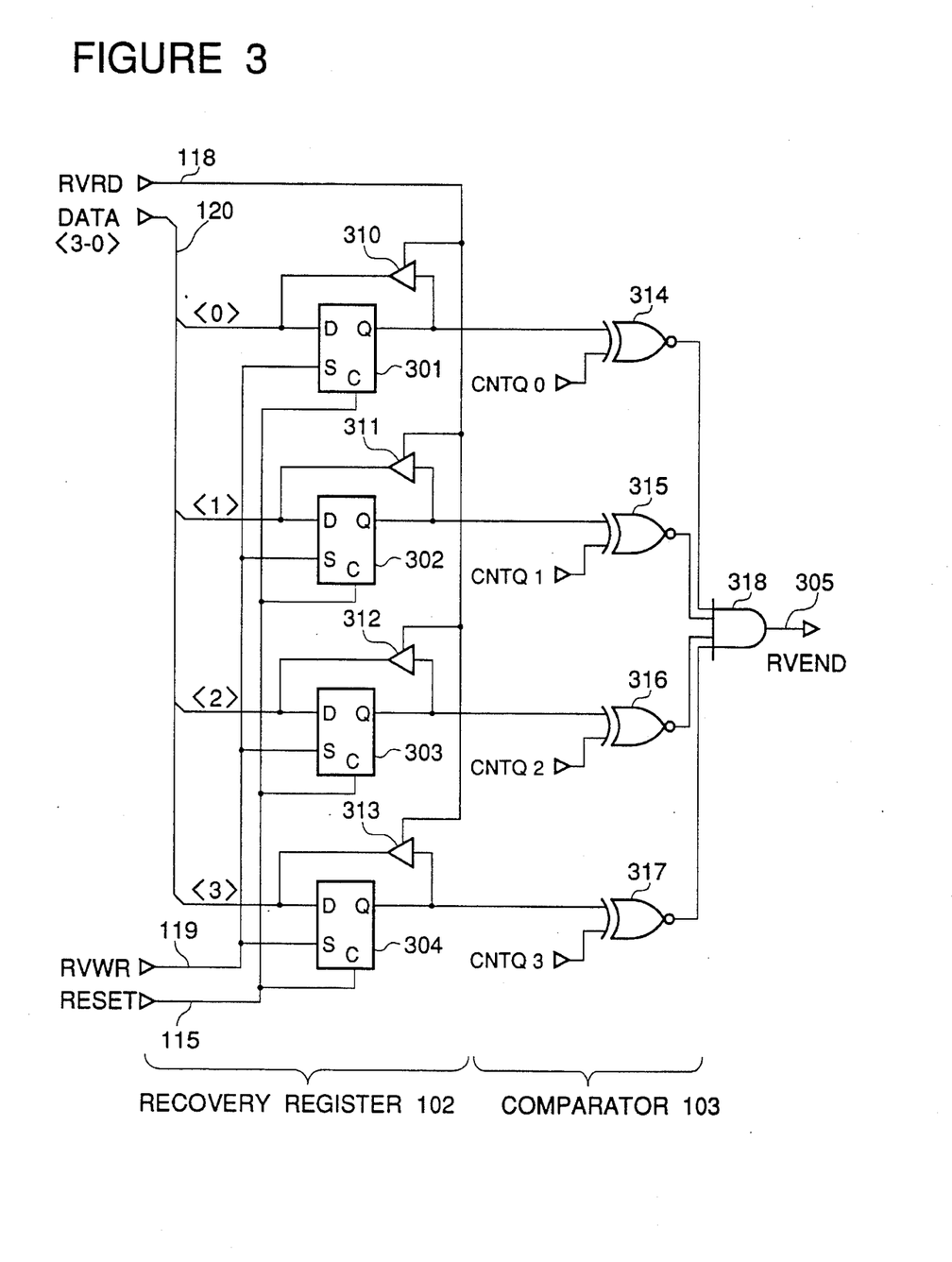
FIG. 3 is a logic circuit diagram of the recovery register circuit and the comparator shown in FIG. 1.

Turning to FIG. 3, the recovery register 102 includes four D-type flipflops 301, 302, 303 and 304, and four controlled buffers 310, 311, 312 and 313, each of which is connected between a Q output and a data input D of a corresponding flipflop. Each of the buffers 310, 311, 312 and 313 is controlled by the recovery register read signal RVRD 118. The data input D of each of the four D-type flipflops 301, 302, 303 and 304 is connected to receive a corresponding bit of the recovery data signal DATA<3-0>, and set inputs S of the four D-type flipflops 301, 302, 303 and 304 are connected to receive the recovery register write signal RVWR 119, so that when the recovery data signal DATA<3-0> and the recovery register write signal RVWR 119 are supplied, the recovery register 102 is written with the number of the Ti states which is given by the recovery data signal DATA<3-0> and which corresponds to a recovery time to be set.

In addition, the reset signal RESET 115 is connected to a clear input C of each of the four D-type flipflops 301, 302, 303 and 304, so that when the reset signal RESET 115 is activated, all of the four D-type flipflops 301, 302, 303 and 304 are cleared. When the recovery register read signal RVRD 118 is activated, the four controlled buffers 310, 311, 312 and 313 are rendered active, so that the content of the recovery register 102 (the Q outputs of the four D-type flipflops 301, 302, 303 and 304) can be read out through the four controlled buffers 310, 311, 312 and 313 at its input of the recovery register 102 (the D inputs of the four D-type flipflops 301, 302, 303 and 304).

The comparator 103 includes four exclusive-NOR 314, 315, 316 and 317 connected to receive at its one input the Q output of a corresponding flipflop (301, 302, 303 or 304) of the recovery register 102 and at its other input a corresponding bit output (CNTQ0, CNTQ1, CNTQ2 or CNTQ3) of the counter circuit 101. Outputs of the four exclusive-NOR 314, 315, 316 and 317 are connected to an AND gate 318, which generates a recovery end signal REEND 305 when coincidence is detected. The recovery end signal REEND 305 is latched by the R-S flipflop 130.

As seen from the above, the above mentioned embodiment is characterized by provision of (1) the counter circuit 101, (2) the recovery register circuit 102 and the comparator 103 shown in FIG. 3, (3) the timing generator composed of the combinational circuit 104, the D-type flipflop 105 to 107 and the inverter gate 108, and (4) a control circuit for resetting the counter circuit 101 when the I/O access operation is executed and for controlling to the effect that a next I/O access operation is not executed until the recovery end signal 111 becomes active, the control circuit being composed of the inverter gate 109, the D-type flipflop 126, the inverter gate 127, the AND gate 128, the R-S flipflop 130.

Now, operation of the shown embodiment will be explained with reference to the timing chart of FIG. 4 and the state transition diagram of FIG. 5.

The counter circuit 101 is reset by the counter clear signal CNTCLR 117 in the T2 state at the time of the I/O access. The counter clear signal CNTCLR 117 is generated by a logical product of the T2 state signal 123 (which is one of the outputs of the timing generator) and a signal which is obtained by delaying the memory I/O signal MEM/$\overline{\text{IO}}$ by a half of one clock by action of the D-type flipflop 126 and by inverting the delayed signal by action of the inverter gate 127. On the other hand, the counter clock CNTCLK 116 is generated by inverting the clock signal CLK 110 by action of the inverter gate 109. The counter circuit 101 counts the counter clock CNTCLK 116, and therefore, the number of the Ti states, each of which should form a part of the recovery time. The output signals CNTQ0 to CNTQ3, 125A to 125D of the counter circuit 101, which are indicative of the counted number of the Ti states, are supplied to the comparator 103. The comparator 103 compares the output signals CNTQ0 to CNTQ3 of the counter circuit 101 with the output signals 131 of the recovery register 102, bit by bit. If coincidence is detected, the comparator 103 outputs the recovery end signal RVEND 305, which is supplied through the R-S flipflop 130. As a result, the idle state corresponding to the recovery time is terminated.

Figure 4:
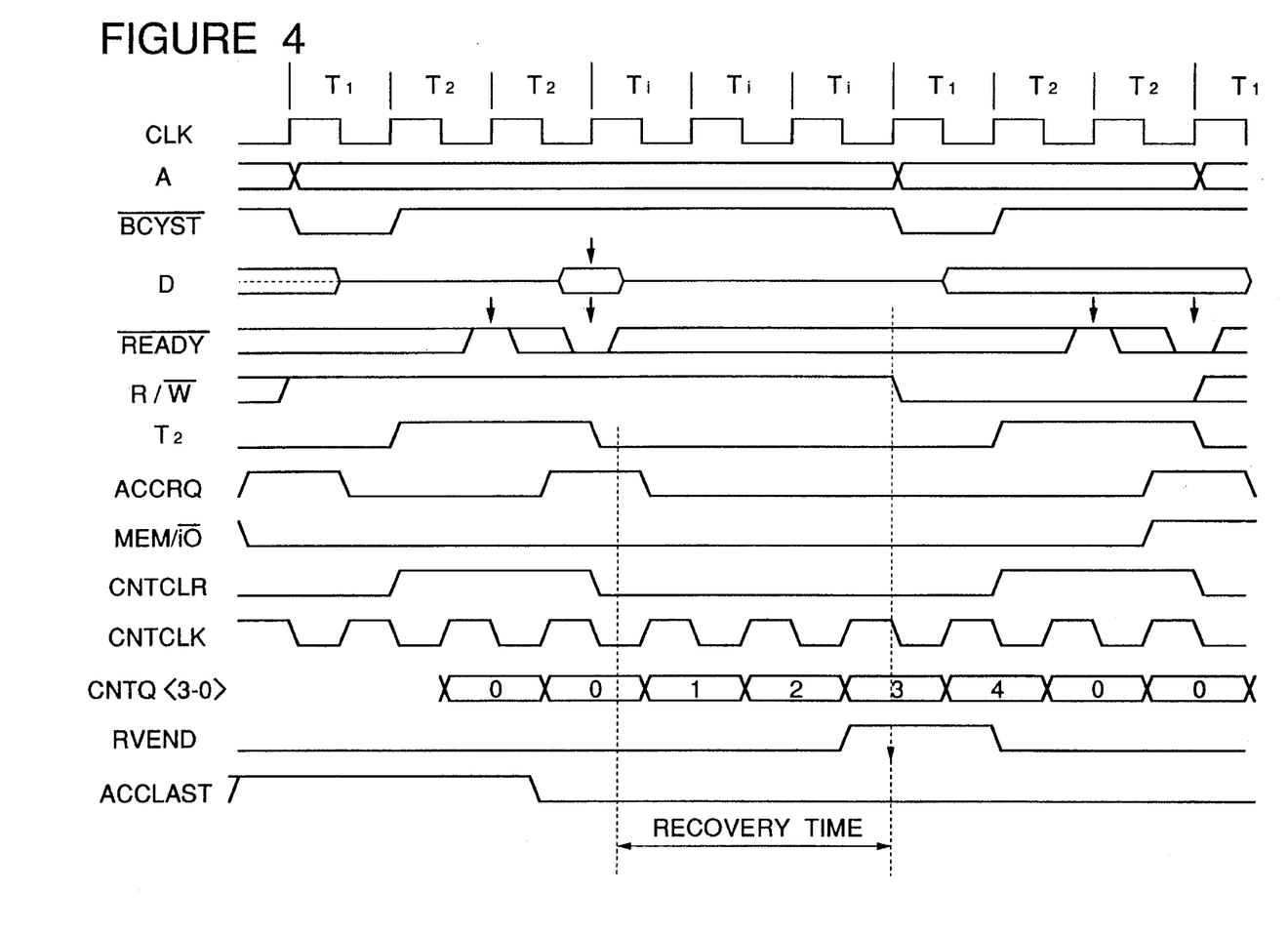
FIG. 4 is a timing chart illustrating one example of the operation of the microprocessor shown in FIG. 1.

In addition, the access request signal ACCRQ 113 is a signal requesting to star a bus cycle, and discrimination between the memory access and the I/O access is made on the basis of the memory I/O signal MEM/$\overline{\text{IO}}$-112, which is at a high level at the time of the memory access and at a low level at the time of the I/O access, as shown in FIG. 4. On the other hand, the last access signal ACCLAST 129 gives information about whether the just preceding bus cycle is the memory access or the. I/O access. As shown in FIG. 4, when the just preceding bus cycle is the memory access, the last access signal ACCLAST 129 is at a high level, and when the just preceding bus cycle is the I/O access, the last access signal ACCLAST 129 is at a low level.

The following TABLE 2 is a logic table of the timing generator of the above mentioned embodiment.

TABLE 2

| NOW | NEXT | RESET | ACCRQ | MEM/iO | READY | RVEND | ACCLAST |
|---|---|---|---|---|---|---|---|
| — | Ti | 1 | — | — | — | — | — |
| Ti | T1 | 0 | 1 | 0 | — | — | 1 |
|    |    | 0 | 1 | 0 | — | 1 | 0 |
|    |    | 0 | 1 | 1 | — | — | — |
| Ti | Ti | 0 | 0 | — | — | 0 | — |
|    |    | 0 | 1 | 0 | — | 0 | 0 |
| T1 | T2 | 0 | — | — | — | — | — |
| T2 | T1 | 0 | 1 | 1 | 0 | — | — |
|    |    | 0 | 1 | 0 | 0 | — | 1 |
|    |    | 0 | 1 | 0 | 0 | 1 | 0 |
| T2 | Ti | 0 | 0 | — | 0 | — | — |
| T2 | T2 | 0 | 1 | 0 | 0 | 0 | 0 |
|    |    | 0 | — | — | 1 | — | — |

Figure 5:
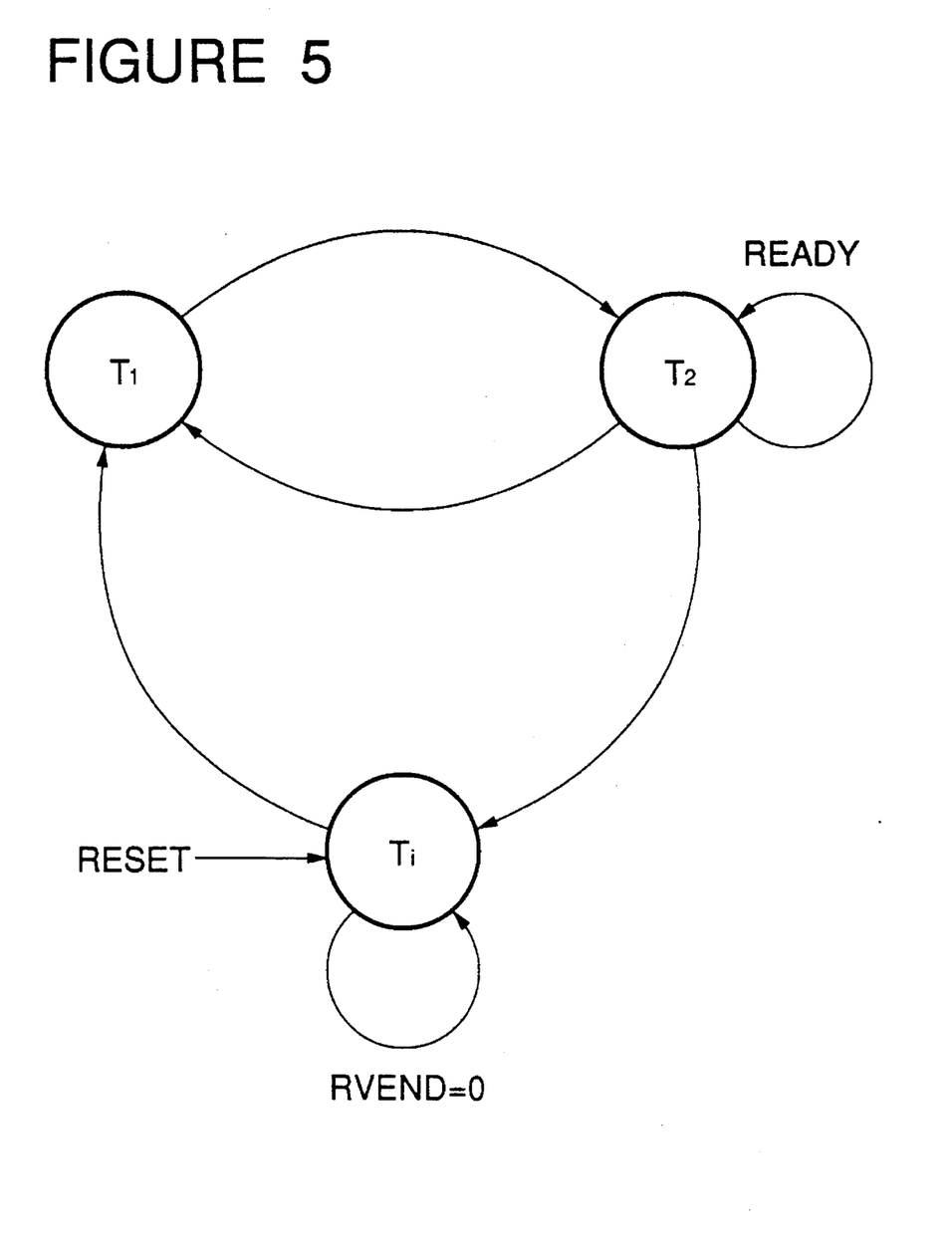
FIG. 5 is a state transition diagram illustrating the operation of the microprocessor shown in FIG. 1.

The above logic table can be expressed in the state transition diagram as shown in FIG. 5.

In the operation example shown in FIG. 4, "3" is set in the recovery register 102 as the number of the Ti states which defines the length of the recovery time. Therefore, when two or more I/O accesses are consecutively executed, three continuous Ti states are inserted between each pair of consecutive I/O accesses. Assuming that a clock frequency is 20 MHz, since the period of one clock is 50 nanoseconds, the recovery time of 150 nanoseconds can be ensured.

In the above mentioned embodiment, since the number of the Ti states defining the length of the recovery time can be freely set or changed in a programmed manner, it is possible to set the length of the recovery time in accordance with the recovery time of an external I/O device.

As seen from the above, the microprocessor in accordance with the present invention capable of executing the I/O recovery processing can set the recovery time to match with an I/O device being coupled. Therefore, in the case that the clock frequency is increased, or in the case that a CPU board is replaced, the existing external I/O devices can be used without modification.

On the other hand, since the recovery processing is executed only in the case of consecutive I/O accesses, no adverse effect is given to the memory access.

The invention has thus been shown and described with reference to the specific embodiments. However, it should be noted that the present invention is in no way limited to the details of the illustrated structures but changes and modifications may be made within the scope of the appended claims.

I claim:

1. A microprocessor which is for use with a clock for generating clock signals and with means for performing an input/output access operation and which has bus cycles including a memory access operation state, an input/output access operation state during which an input/output access operation is performed by the means for performing an input/output access operation, and an idle state, the microprocessor comprising:

detecting means for detecting that said input/output access operation of said input/output access operation state is consecutively executed;

memory means for storing a number of idle states to be inserted and for generating an output;

counting means for counting clock signals generated by said clock and for generating an output;

means for comparing said output of said memory means with said output of said counting means, and for generating a recovery end signal when said output of said memory means is coincident with said output of said counting means; and control means, coupled to said comparing means for receiving said recovery end signal, for resetting said counting means when said input/output access operation is executed, and for controlling said control means for performing an input/output access operation such that a next input/output access operation is not executed until said recovery end signal is received by said control means, when said detecting means has detected that said input/output access operation is consecutively executed, wherein said detecting means includes a timing generator, and wherein said timing generator includes:

a combinational circuit for receiving a first state signal and a second state signal for an access operation, an idle state signal, said recovery end signal, a last access signal, a memory input/output signal, an access request signal, a ready signal and a reset signal, said combinational circuit including means for generating said first state signal, said second state signal, and said idle state signal;

first, second and third latches for latching said first state signal, said second state signal, and said idle state signal, respectively, in response to a clock signal from said clock, said first, second and third latches being cleared by said reset signal; and an inverter connected to an output of said first latch for outputting a bus cycle start signal which includes an inverted signal of an output of said first latch.

2. A microprocessor which is for use with a clock for generating clock signals and with means for performing an input/output access operation and which has bus cycles including a memory access operation state, an input/output access operation state during which an input/output access operation is performed by the means for performing an input/output access operation, and an idle state, the microprocessor comprising:

detecting means for detecting that said input/output access operation of said input/output access operation state is consecutively executed;

memory means for storing a number of idle states to be inserted and for generating an output;

counting means for counting clock signals generated by said clock and for generating an output;

means for comparing said output of said memory means with said output of said counting means, and for generating a recovery end signal when said output of said memory means is coincident with said output of said counting means; and control means, coupled to said comparing means for receiving said recovery end signal, for resetting said counting means when said input/output access operation is executed, and for controlling said means for performing an input/output access operation such that a next input/output access operation is not executed until said recovery end signal is received by said control means, when said detecting means has detected that said input/output access operation is consecutively executed, wherein said memory means includes a recovery register circuit for receiving a recovery register read signal, a recovery register write signal, and a recovery data of n bits, and having a n-bit register for storing the number of idle states representing the recovery time.

* * * * *